United States Patent [19]

Knight et al.

[11] Patent Number: 5,021,489

[45] Date of Patent: Jun. 4, 1991

[54] CORROSION-INHIBITING COATING COMPOSITION

[75] Inventors: Walter E. Knight; Kenneth G. Clark, both of Chalfont; David L. Gauntt, Jamison, all of Pa.

[73] Assignee: The United States of America as represented by the Secretary of the Navy, Washington, D.C.

[21] Appl. No.: 486,689

[22] Filed: Mar. 1, 1990

[51] Int. Cl.$^5$ ............................................. C08K 5/521
[52] U.S. Cl. ................................ 524/140; 427/388.1; 427/388.2; 427/388.5; 524/145; 524/166; 524/390
[58] Field of Search ............ 525/29; 427/388.1, 388.2, 427/388.5; 524/140, 166, 390, 145

[56] References Cited

U.S. PATENT DOCUMENTS

| | | | |
|---|---|---|---|
| 3,293,189 | 12/1966 | Morganthaler | 252/389.24 |
| 3,305,504 | 2/1967 | Huntington | 427/388.2 |
| 3,493,440 | 2/1970 | Ashdown | 106/14.12 |
| 4,291,135 | 9/1981 | Hohlein et al. | 427/388.2 |

FOREIGN PATENT DOCUMENTS 51-109390  9/1976  Japan.
1-297482  11/1989  Japan.

*Primary Examiner*—Veronica P. Hoke
*Attorney, Agent, or Firm*—James V. Tura; James B. Bechtel; Susan E. Verona

[57] ABSTRACT

This invention relates to corrosion-inhibiting compositions and particularly to compositions capable of forming films on metal substrates to protect said metal from corrosion. The film-forming compositions which are capable of displacing moisture from the metal surface comprises effective amounts of an acrylic resin, a silicone resin and a copolymer derived from a silicone and alkyd monomers. These resins together with effective amounts of an organic phosphate and a sulfonate are used in combination with lower molecular weight alcohols and at least one solvent.

10 Claims, No Drawings

5,021,489

CORROSION-INHIBITING COATING COMPOSITION

STATEMENT OF GOVERNMENT INTEREST

This invention described herein may be manufactured and used by and for the Government of the United States of America for governmental purposes without the payment of any royalties thereon or therefor.

BACKGROUND OF THE INVENTION

This invention is directed to a corrosion-inhibiting composition and more particularly to a coating composition useful for protecting various metal surfaces from corrosion.

The corrosion of metal and particularly metal used in the manufacture of heavy equipment, automobiles, aircraft, ships and alike is the concern of both the manufactures and maintenance personnel because of the problems that corrosion deterioration causes with respect to the effective operation of such equipment. More specifically, certain environments such as salt air and exhaust gases produced from various power plants and the like are known to be very corrosive to metal. In a sense, corrosion causes a breakdown of the metal whereby the structural integrity of the metal and the equipment is compromised. Therefore, it is very important to find methods of preventing corrosion and/or providing corrosion-resistant compositions i.e. coatings to protect metal substrate.

Coatings including corrosion-resistant paints, provides some barrier against corrosion. However, most painted surfaces eventually fail depending on the type of paint and the condition of the environment. Moreover, paint covering metal substrates often cracks or is scratched during operation thereby leaving the metal surface exposed to the corrosive reaction with the environment. Accordingly, the availability of a corrosion-resistant composition which can be applied to remedy such defects even when moisture or salt water droplets cover the surface is of prime importance to effectively control corrosion. Presently, the corrosion compositions e.g. paints that have been developed have not been completely satisfactory primarily because of the failure of the coating to effectively adhere to the metal substrate.

SUMMARY OF THE INVENTION

It is an object of this invention to provide a coating composition which can be applied to a metal substrate by usual procedures to effectively inhibit corrosion.

It is a further object of this invention to provide a composition and a method of applying said composition onto various metal substrate which is effective in displacing moisture from said surface and forms a protective film thereon to protect the metal from corrosion.

It is still a further object of this invention to provide a corrosion-resistant composition which displaces moisture and/or water from the surface and forms a clear film thereon which is flexible, resistant to abrasion and weathering and can be removed with ordinary solvents.

These and other objects of the invention will become apparent from a further and more detailed description of the invention as setforth herein.

DESCRIPTION OF THE PREFERRED EMBODIMENT

This invention is directed to a novel corrosion-inhibiting composition particularly useful for displacing water or moisture from a metal surface to form a film thereon which protects the metal against corrosion. The composition may be applied by conventional methods either on a painted or unpainted surface and subsequently dried at ambient or room temperatures to form a clear, flexible, non-tacky film particularly resistant to abrasion, weathering and corrosion.

Specifically, the film-forming composition comprises from about 10 to 35 and preferably 15 to 20 parts by weight of an acrylic resin, 10 to 35 and preferably 15 to 20 parts by weight of a silicone resin, 2 to 35 and preferably 5 to 10 parts by weight of a silicone-alkyd copolymer resin, 0.5 to 5.0 and preferably 2 to 4 parts by weight of an organic phosphate, 1.0 to 10 and preferably 2 to 5 parts by weight of a metal sulfonate, 5 to 40 and preferably 10 to 30 parts by weight of at least one lower molecular weight aliphatic alcohol, and 10 to 50 and preferably 20 to 40 parts by weight of at least of one organic solvent.

The acrylic resins are available commerically as Acryloids B-67 and B-67MT from the Rohm & Haas Company. These acrylic resins are particularly useful for purposes of this invention since they are compatible with both the medium and long-oil alkyds and are soluable in various organic solvents including toluene, xylene, naphtha, mineral spirits, alcohols, ketones and various other known aromatic and aliphatic solvents useful in preparing coatings. These acrylic polymers were designed for compatibility with the alkyd resins and are useful therefore in preparing coatings of improved hardness, fast drying and resistant to abrasion.

The preferred acrylic resins are colorless liquids having a viscosity, cps of 800–1600, a glass transition temperature of 50° C., a flashpoint of 106° F., and a density in pounds per gallon of 7.4.

The silicone resins utilized in the compositions of this invention are used in amounts ranging from about 10 to 35 parts by weight and preferably in amounts from about 15 to 20 parts by weight. These silicone resins are capable of forming moisture-resistant coatings by air drying for about 10 to 20 minutes at room or ambient temperatures to form a tack-free film. However, to obtain adequate moisture resistance, it is preferred to allow longer drying. The preferred silicone resins are available commerically from the General Electric Company under the name SR-80M and are characterized as having a viscosity (cps) at 25° C. of between 8-40, and are available in solvents such as toluene and alcohols. These resins have a silicone content of about 34 percent, a specific gravity of 0.95 and a density of pounds per gallon of 7.9.

The silicone-alkyd copolymers useful for purpose of this invention are derived from the reaction of a medium or short-oil alkyd with a silicone monomer to obtain copolymers with about 45 to 52 percent of nonvolatile material (NVM). The silicone copolymers have a viscosity (Gardner-Holdt) of about 1, a specific gravity of 77° F. of 0.9, and an acid number of 6.5. These silicone-alkyd copolymers form coatings having excellent heat resistance and together with the acrylic and silicone resins, according to this invention, provide the primary film forming resins. The silicon-alkyd copolymers provide the hardness, strength and abrasion resistance for the coating. The silicon-alkyd copolymers may be characterized as having a phthalic anhydride content of approximately 20 percent by weight and a minimum oil content, preferably linseed oil for drying qualities, of about 25 percent. A particularly preferred silicone-alkyd resin is available commercially from McCloskey Varnish Company under the trademark Varkyd 385-50E.

The oil soluble sulfonates and particularly the metal salts e.g. petroleum sulfonates are derived from the reaction of an alkaline earth metal compound with a sulfonic acid. The sulfonates together with the alkyl phosphates, in accordance with this invention, function to inhibit corrosion of the metal substrate. Small but effective amounts of the sulfonates i.e. from 1.0 to 10 parts by weight are incorporated into a mixture of the film-forming polymeric resins to inhibit corrosion without adversely affecting the film forming properties of the coating. More specifically, the sulfonates are alkyl and/or aryl substituted sulfonic acids or a petroleum sulfonic acid neutralized with one or more alkaline earth metal compounds such as barium or calcium hydroxide to form the corresponding salt e.g. barium, calcium or zinc petroleum sulfonate. A preferred class of sulfonates includes the dinonylnaphthlene sulfonates derived from a dinonylnaphthlene sulfonic acid and an alkaline earth metal compound. These metal sulfonates having molecular weights ranging from about 800 to 5000 and are available commercially from King Industries. In addition to the alkaline earth sulfonates, other metal sulfonates include sodium sulfonate, which also may be used as corrosion-inhibitors in the film-forming resins of this invention.

The alkyl substituted phosphate salts include many known phosphates such as the acid phosphates which are available commercially from the DuPont Company as RP-2. A specific alkyl ammonium acid phosphate is characterized as having a boiling point of 177° C., a specific gravity of 0.93, and is only slightly soluble in water. These organic phosphates together with the sulfonates are used in combination with the acrylic silicone resins in amounts ranging from about 0.5 to 5.0 parts by weight and preferably in an amount ranging from about 2 to 4 parts by weight of the composition.

The following examples illustrate the corrosion resistant film-forming compositions of this invention.

| Example I | |
|---|---|
| Component | Parts by Weight |
| Acrylic resins | 10 to 35 |
| Silicone resins | 10 to 35 |
| Silicone-alkyd resins | 2 to 35 |
| Organic phosphates | 0.5 to 5 |
| Petroleum sulfonate salts | 1.0 to 10 |
| Low molecular weight alcohols | 5 to 40 |
| Hydrocarbon solvents | 10 to 50 |

| Example II | |
|---|---|
| Component | Parts by Weight |
| Acrylic resin (B-67) | 17.3 |
| Silicone resin (SR-80M) | 17.3 |
| Silicone-alkyd resin (VARKYD 385-50E) | 8.6 |
| Alkyl ammonium organic phosphate RP-2 | 3.5 |
| Barium petroleum sulfonate (mol. wt of 1000) | 2.0 |

| Example II -continued | |
|---|---|
| Component | Parts by Weight |
| Isopropyl alcohol | 17.3 |
| Cellosolve acetate | 8.6 |
| Isobutyl alcohol | 8.6 |
| VM & P Naphtha | 17.1 |

| Example III | |
|---|---|
| Component | Parts by Weight |
| Acrylic resin | 17.3 |
| Silicone resin | 17.3 |
| Silicone-alkyd resin | 8.6 |
| Alkyl ammonium organic phosphate | 3.5 |
| Barium petroleum sulfonate | 2.0 |
| Isopropyl alcohol | 17.3 |
| Propylene glycolmonomethyl ether | 8.6 |
| Isobutyl alcohol | 8.6 |
| VM & P Naphtha | 17.1 |

| Example IV | |
|---|---|
| Component | Parts by Weight |
| Acrylic resin | 17.3 |
| Silicone resin | 17.3 |
| Silicone-alkyd resin | 8.6 |
| Organic phosphate | 3.5 |
| Petroleum sulfonate | 2.0 |
| Low molecular weight alcohol | 17.3 |
| Hydrocarbon solvents | 34.3 |

The drying time of the films formed from the corrosion-resistant compositions of this invention can be controlled to some degree by varying the proportion of the solvents and the type of solvents used based on the rate of evaporation. However, by increasing the drying time of the film, the effectiveness of the coating to displace moisture may be adversely affected. Accordingly, the drying time of the film should be regulated so that the water displacement occurs before the film forms over the surface and entraps the moisture. Generally, the films obtained from the composition of this invention are colorless, however, the coatings may be colored by the addition of the appropriate coloring agent. For example, effective amounts of various coloring agents may be incorporated into the film-forming composition including white pigments such as $TiO_2$. The films may be applied to the metal surface by conventional methods including, for example, brushing or spraying, etc., and may be applied directly to the metal surface without prior treatment.

While the film forming compositions of this invention have excellent adhesion to both painted and unpainted surfaces, the films can be removed by using conventional solvents. These solvents include, for example, the ketones such as methyl ethyl ketone, toluene, naphtha, xylene, benzene and various mixtures of these organic solvents. These solvents can be used also in preparing the film-forming coatings of this invention. A particularly important solvent which functions as the coupling agent for the other components include the lower molecular weight alcohols, e.g. alcohols having 3 to 5 carbon atoms such as isopropanol, butanol, isopentanol, amyl alcohol, diacetone alcohol and the like. In addition to the alcohols, other solvents particularly useful in forming the film include the Cellosolves such as butyl Cellosolve, the Carbitols such as Carbitol acetate, and the acetates such as the ethyl, butyl or propyl acetates. Other solvents include mineral spirits and the aromatic solvents such as toluene, xylene, the aliphatic and aromatic naphthas and various mixtures thereof in various proportions.

While this invention has been described by a number of specific embodiments, it is obvious that there are other variations and modifications which can be made without departing from the spirit and scope of the invention as set forth in the appended claims.

The invention claimed:

1. A water displacing corrosion-inhibiting composition which comprises from about 10 to 35 parts by weight of an acrylic resin, 10 to 35 parts by weight of a silicone resin, 2 to 35 parts by weight of a silicone-alkyd copolymer resin, 0.5 to 5.0 parts by weight of an organic phosphate, 1.0 to 10 parts by weight of a sulfonate, 5 to 40 parts by weight of at least one lower molecular weight alcohol, and 10 to 50 parts by weight of at least one organic solvent.

2. The composition of claim 1 further characterized in that the organic phosphate is an alkyl ammonium phosphate and the sulfonate is an alkaline earth metal petroleum sulfonate.

3. The composition of claim 2 further characterized in that the lower molecular weight alcohol has 3 to 5 carbon atoms.

4. The composition of claim 3 further characterized in that the organic solvent comprises an aromatic hydrocarbon.

5. The composition of claim 4 further characterized in that the organic solvent comprises a mixture of an aromatic hydrocarbon and a glycol ether.

6. The composition of claim 5 further characterized in that the organic solvent comprises a mixture of cellosolve acetate and an aromatic hydrocarbon.

7. A process for protecting metal surfaces against corrosion by displacing moisture and forming a protective coating thereon which comprises applying to said moisture covered metal surfaces a corrosion-inhibiting composition comprising from about 10 to 35 parts by weight of an acrylic resin, 10 to 35 parts by weight of a silicone resin, 2 to 35 parts by weight of a silicone-alkyd copolymer resin, 0.5 to 5.0 parts by weight of an organic phosphate, 1.0 to 10 parts by weight of a sulfonate, 5 to 40 parts by weight of a lower molecular weight alcohol, and 10 to 50 parts by weight of at least one organic solvent.

8. The process of claim 7 further characterized in that the sulfonate is an alkaline earth metal sulfonate and the alcohol comprises isopropanol.

9. The process of claim 8 further characterized in that the organic phosphate is an alkyl ammonium phosphate and the organic solvent comprises an aliphatic or an aromatic hydrocarbon and a glycol ether.

10. The process of claim 7 further characterized in that the coating formed on the surface of the metal is air dried at room temperatures.

* * * * *